United States Patent Office 3,281,255
Patented Oct. 25, 1966

3,281,255
OPHTHALMIC SEGMENT GLASS COMPOSITIONS
Gordon F. Brewster, Williamson, N.Y., assignor to Bausch & Lomb Incorporated, Rochester, N.Y., a corporation of New York
No Drawing. Filed Mar. 18, 1963, Ser. No. 266,067
5 Claims. (Cl. 106—54)

This invention relates to novel glass compositions of the type used for ophthalmic segment glass and more particularly to novel green segment glass compositions which are compatible with green crown glass of the type used for spectacle lenses.

An increased demand for "sun glasses" has caused a corresponding increase in the demand for green colored multifocal prescription lenses. Accordingly endeavors have been made to develop a green segment glass for use with the green crown glasses. Segment glasses of this type should have indices of refraction $n$ in the range of approximately 1.616 to 1.664. Generally the approximation of indices may be construed as plus or minus .002. Each of these compositions are compatible with and tailored for use with crown glass having transmittances of approximately 31%.

The viscosity of segment glasses must be compatible with the viscosity of the crown glass forming the spectacle lens. The viscosity of the segment glasses is selected, so that, when the segment glass is placed in a countersink in the crown glass, and during fusion therebetween, the crown remains relatively rigid and the segment flows without causing distortion or changes in the curvature of the countersink curve.

It is also important in compounding segment glasses to obtain a high $\nu$ value i.e. where $$\nu = \frac{n_D - 1}{n_F - n_C}$$

The value is the ratio of the refractive index, for the D line (sodium light) minus one to the difference between the refractive indices for the F and C lines (the mean dispersion). A high $\nu$ value is desirable to obtain a relatively low dispersion which tends to overcome chromatic aberrations. It should be understood however, that in the present case i.e. with colored segment glasses the $\nu$ is of secondary consideration.

The expansion rates of a segment glass must be compatible with the crown glass with which it is used. Other requirements for segment glasses relate to durability, hardness, acid resistance, clear color or transparency, freedom from any cloudy or milky appearance, and color stability.

The segment glasses according to the present invention are not only compatible with the green colored crown glasses having similar expansion characteristics but also fulfill the necessary physical and optical requirements relating to durability, hardness, acid resistance, clear color or transparency, freedom from any clouding or milky appearance, and color stability.

Briefly, the segment glasses according to the present invention have indices of refraction in the range of approximately 1.616 to approximately 1.664 and a $\nu$ value of approximately 48.3–40.1 respectively. The segment glass composition consists essentially of the following ingredients given in ranges of weight percent batch basis:

| | |
|---|---|
| $SiO_2$ | 28.35–33.52 |
| BaO | 14.72–17.52 |
| ZnO | 1.55– 4.64 |
| $Na_2O$ | 7.39– 8.05 |
| $K_2O$ | 1.59– 4.30 |
| $TiO_2$ | 4.42– 7.70 |
| $ZrO_2$ | 2.99– 3.84 |
| CaO | 2.17– 4.78 |
| SrO | 4.73– 6.94 |
| MgO | 0– 2.35 |
| PbO | 0– 7.68 |
| $B_2O_3$ | 12.76–17.08 |
| $Fe_2O_3$ | .582– .786 |
| $Cr_2O_3$ | .059– .096 |
| $Co_3O_4$ | .030– .034 |
| NiO | .080– .115 |

The batch basis relates to the raw batch ingredients which may be compounded according to various techniques, one of which is shown by way of example subsequently in the specification.

Segment glasses have been colored by antimony, chromium, nickel and cobalt, see for example the U.S. patent to Armstead 2,699,399. Systems of this type do not, however, include iron, primarily because melting of lead containing glass under the reducing conditions necessary to produce the iron oxide greenish tint results in the reduction of the lead oxide to metallic lead. It has now been found, however, that a mixture of iron oxide $Cr_2O_3$, $Co_3O_4$, and NiO in certain proportions produces the desired greenish color in a silica segment glass.

The glasses according to the present invention may be compounded by adding the oxides themselves or any desired material that will decompose or react in the melt to produce the specified oxides. For example, the corresponding carbonates, or hydrates may be used. In producing glass compositions according to the present invention the following ingredients have been used to obtain the desired composition.

| Oxide: | Batch ingredient |
|---|---|
| $SiO_2$ | $SiO_2$ |
| BaO | $BaCO_3$ |
| ZnO | ZnO |
| $K_2O$ | $K_2CO_3$ |
| $Na_2O$ | $Na_2CO_3$ |
| $Li_2O$ | $Li_2CO_3$ |
| $TiO_2$ | $TiO_2$ |
| $ZrO_2$ | $ZrO_2$ or $ZrSiO_4$ |
| CaO | $CaCO_3$ |
| MgO | $MgCO_3$ |
| SrO | $SrCO_3$ |
| PbO | PbO |
| $B_2O_3$ | $B(OH)_3$ or borax |
| $Al_2O_3$ | $Al_2O_3$ or $Al(OH)_3$ |

The conditions and controls for carrying out the melting, annealing and cooling steps are subject to wide variation. For example, in some cases a batch of raw ingredients are melted in a refractory pot, crucible or a platinum lined vessel, and in other cases a continuous melting process may be used. Similarly, temperatures, times and conditions vary according to the amount of glass being formed. Therefore, the temperatures and melting conditions recited hereinafter are given by way of illustration and are not intended to limit the scope of the appended claims.

The segment glasses according to the present invention have in some cases been prepared in approximately 10 pound batches in a platinum lined vessel approximately five inches high and five inches in diameter. While platinum is not absolutely necessary it is preferred because of the corrosive action on refractory containers during the melting and fining operations caused by glasses of the present type.

The vessel is preheated to approximately 1300° C. Thereafter, a portion of the mixed batch is added to the vessel and as the batch melts, additional portions of the batch are added until the charge is completed. Adding the batch in the aforementioned manner takes approximately two hours. The temperature is thus increased to approximately 1350° C. and a platinum stirrer which may be water cooled is then introduced and used to stir the melt. During stirring, the melt is maintained at approximately 1350° C. Stirring at this temperature was continued for 8 or more hours.

The glass is cooled to approximately 1200° C., the stirrer removed and the glass cast on a plate which is approximately 200° C. Cooling from 1350° C. to 1200° C., removing the stirrer and casting was accomplished in approximately one hour. After the casting, the glass is placed in an annealing furnace maintained at approximately 550° C., and annealed for approximatey two to four hours. Subsequently, the glass is cooled slowly. For a piece of glass approximately ½ inch thickness the glass is cooled at approximately 50° C. per hour to room temperature.

Segment glasses according to the present invention may be tailored for particular applications. Such matters as are contained in the text "Properties of Glass" by G. W. Morey are considered in compounding and preparing the novel segment glasses disclosed herein. Generally the Morey reference speaks of optical glasses, however, much of the material may be construed as being more or less directly applicable to segment glasses. Further considerations which are readily apparent to those skilled in the art and which are not clearly set forth herein in detail are contained in the text "Modern Ophthalmic Lenses and Optical Glass" by Theo E. Obrig (1935).

The details of manufacturing optical glass are more clearly set forth in "The Manufacture of Optical Glass and of Optical Systems" by F. E. Wright, Ordnance Department Docment No. 2037, Government Printing Office 1924. Chapter 3 of the aforementioned treatise sets forth the particular processes involved an sets forth what may be considered to be conventional techniques.

The index of refraction may be regulated by increasing the barium oxide. Strontium oxide, calcium, magnesium oxide, and zinc oxide are also used to regulate the index of refraction, however, these materials have a lesser effect on the index of refraction than the barium oxide. Increasing the lead oxide also increases the index of refraction. It has been found that small quantities of lead oxide are tolerable without adversely affecting the $\nu$ value.

Titanium dioxide and zirconium dioxide also tend to impart a high index of refraction. The titanium and zirconium dioxides, however, are added primarily for improving the acid resistance of the segment glasses.

The viscosity of the glass is effected by $B_2O_3$. Increasing the $B_2O_3$ tends to decrease the viscosity. An increase in the silica, however, increases the viscosity. The viscosity is selected so that the crown glass is not damaged during fusion. The $B_2O_3$ also tends to improve the $\nu$ value.

Sodium, and potassium oxides impart a higher expansion to glass than most other oxides. In the present glasses they are compounded in order to control the expansion characteristics of the segment glasses. The expansion of the novel segment glasses disclosed herein are compatible with the respective crown glasses with which they are used. The alkalis are mixed in order to further complicate the composition.

It should be understood, however, that changes in each of the ingredients have some effect on all of the properties. In the present compositions the glasses have been tailored to fit the particular properties desired for crown glasses having compatible characteristics.

The following examples set forth several operative embodiments and are not to be construed as limiting the scope of the invention. Examples A and B represent the presently preferred embodiments of the invention. The indices of refraction of samples B and E are 1.616 and 1.664 respectively. The examples are given in weight percent batch basis.

|  | A | B |
|---|---|---|
| $SiO_2$ | 32.54 | 29.23 |
| $BaO$ | 17.01 | 15.18 |
| $ZnO$ | 1.60 | 4.50 |
| $Na_2O$ | 7.62 | 7.82 |
| $K_2O$ | 4.17 | 1.64 |
| $TiO_2$ | 4.56 | 7.48 |
| $ZrO_2$ | 3.08 | 3.73 |
| $CaO$ | 4.64 | 2.24 |
| $SrO$ | 4.88 | 6.74 |
| $MgO$ | 2.28 |  |
| $PbO$ |  | 7.46 |
| $B_2O_3$ | 16.58 | 13.15 |
| $Fe_2O_3$ | .763 | .600 |
| $Cr_2O_3$ | .093 | .061 |
| $Co_3O_4$ | .031 | .033 |
| $NiO$ | .112 | .0824 |

For practical purposes it has been found that the ingredients given in the examples may vary within the following limits.

|  | For Example A | For Example B |
|---|---|---|
| $SiO_2$ | 31.56–33.52 | 28.35–30.11 |
| $BaO$ | 16.50–17.52 | 14.72–15.64 |
| $ZnO$ | 1.55–1.65 | 4.36–4.64 |
| $Na_2O$ | 7.39–7.85 | 7.59–8.05 |
| $K_2O$ | 4.04–4.30 | 1.59–1.69 |
| $TiO_2$ | 4.42–4.70 | 7.26–7.70 |
| $ZrO_2$ | 2.99–3.17 | 3.62–3.84 |
| $CaO$ | 4.50–4.78 | 2.17–2.31 |
| $SrO$ | 4.73–5.03 | 6.54–6.94 |
| $MgO$ | 2.21–2.35 |  |
| $PbO$ |  | 7.24–7.68 |
| $B_2O_3$ | 16.50–17.08 | 12.76–13.54 |
| $Fe_2O_3$ | .740–.786 | .582–.618 |
| $Cr_2O_3$ | .090–.096 | .059–.063 |
| $Co_3O_4$ | .030–.032 | .032–.034 |
| $NiO$ | .109–.115 | .0800–.0848 |

What is claimed is:

1. A segment glass composition consisting essentially of the following ingredients, percent by weight batch basis:

$SiO_2$ ---- 28.35–33.52
$BaO$ ---- 14.72–17.52
$ZnO$ ---- 1.55– 4.64
$Na_2O$ ---- 7.39– 8.05
$K_2O$ ---- 1.59– 4.30
$TiO_2$ ---- 4.42– 7.70
$ZrO_2$ ---- 2.99– 3.84
$CaO$ ---- 2.17– 4.78
$SrO$ ---- 4.73– 6.94
$MgO$ ---- 0– 2.35
$PbO$ ---- 0– 7.68
$B_2O_3$ ---- 12.76–17.08
$Fe_2O_3$ ---- .582– .786
$Cr_2O_3$ ---- .059– .096
$Co_3O_4$ ---- .030– .034
$NiO$ ---- .080– .115

2. A segment glass composition consisting essentially of the following ingredients, percent by weight batch basis:

$SiO_2$ ---- 31.56–33.52
$BaO$ ---- 16.50–17.52
$ZnO$ ---- 1.55– 1.65
$Na_2O$ ---- 7.39– 78.5
$K_2O$ ---- 4.04– 4.30
$TiO_2$ ---- 4.42– 4.70
$ZrO_2$ ---- 2.99– 3.17
$CaO$ ---- 4.50– 4.78
$SrO$ ---- 4.73– 5.03
$MgO$ ---- 2,21– 2.35
$B_2O_3$ ---- 16.50–17.08
$Fe_2O_3$ ---- .740– .786
$Cr_2O_3$ ---- .090– .096
$Co_3O_4$ ---- .030– .032
$NiO$ ---- .109– .115

3. A segment glass composition consisting essentially of the following ingredients, percent by weight batch basis:

| | |
|---|---|
| $SiO_2$ | 28.35–30.11 |
| $BaO$ | 14.72–15.64 |
| $ZnO$ | 4.36– 4.64 |
| $Na_2O$ | 7.59– 8.05 |
| $K_2O$ | 1.59– 1.69 |
| $TiO_2$ | 7.26– 7.70 |
| $ZrO_2$ | 3.62– 3.84 |
| $CaO$ | 2.17– 2.31 |
| $SrO$ | 6.54– 6.94 |
| $PbO$ | 7.24– 7.68 |
| $B_2O_3$ | 12.76–13.54 |
| $Fe_2O_3$ | .582– .618 |
| $Cr_2O_3$ | .059– .603 |
| $Co_3O_4$ | .032– .034 |
| $NiO$ | .0800–.0848 |

4. A segment glass composition consisting essentially of the following ingredients, percent by weight batch basis:

| | |
|---|---|
| $SiO_2$ | 32.54 |
| $BaO$ | 17.01 |
| $ZnO$ | 1.60 |
| $Na_2O$ | 7.62 |
| $K_2O$ | 4.17 |
| $TiO_2$ | 4.56 |
| $ZrO_2$ | 3.08 |
| $CaO$ | 4.64 |
| $SrO$ | 4.88 |
| $MgO$ | 2.28 |
| $B_2O_3$ | 16.58 |
| $Fe_2O_3$ | .763 |
| $Cr_2O_3$ | .093 |
| $Co_3O_4$ | .031 |
| $NiO$ | .112 |

5. A segment glass composition consisting essentially of the following ingredients, percent by weight batch basis:

| | |
|---|---|
| $SiO_2$ | 29.23 |
| $BaO$ | 15.18 |
| $ZnO$ | 4.50 |
| $Na_2O$ | 7.82 |
| $K_2O$ | 1.64 |
| $TiO_2$ | 7.48 |
| $ZrO_2$ | 3.73 |
| $CaO$ | 2.24 |
| $SrO$ | 6.74 |
| $PbO$ | 7.46 |
| $B_2O_3$ | 13.15 |
| $Fe_2O_3$ | .600 |
| $Cr_2O_3$ | .601 |
| $Co_3O_4$ | .033 |
| $NiO$ | 0.824 |

References Cited by the Examiner

UNITED STATES PATENTS

| | | | |
|---|---|---|---|
| 2,523,264 | 9/1950 | Armistead | 106—54 |
| 2,523,265 | 9/1950 | Armistead | 106—54 |
| 2,523,266 | 9/1950 | Armistead | 106—54 |
| 2,699,399 | 1/1955 | Armistead | 106—54 |

TOBIAS E. LEVOW, *Primary Examiner.*

H. McCARTHY *Assistant Examiner.*